Figure 1:
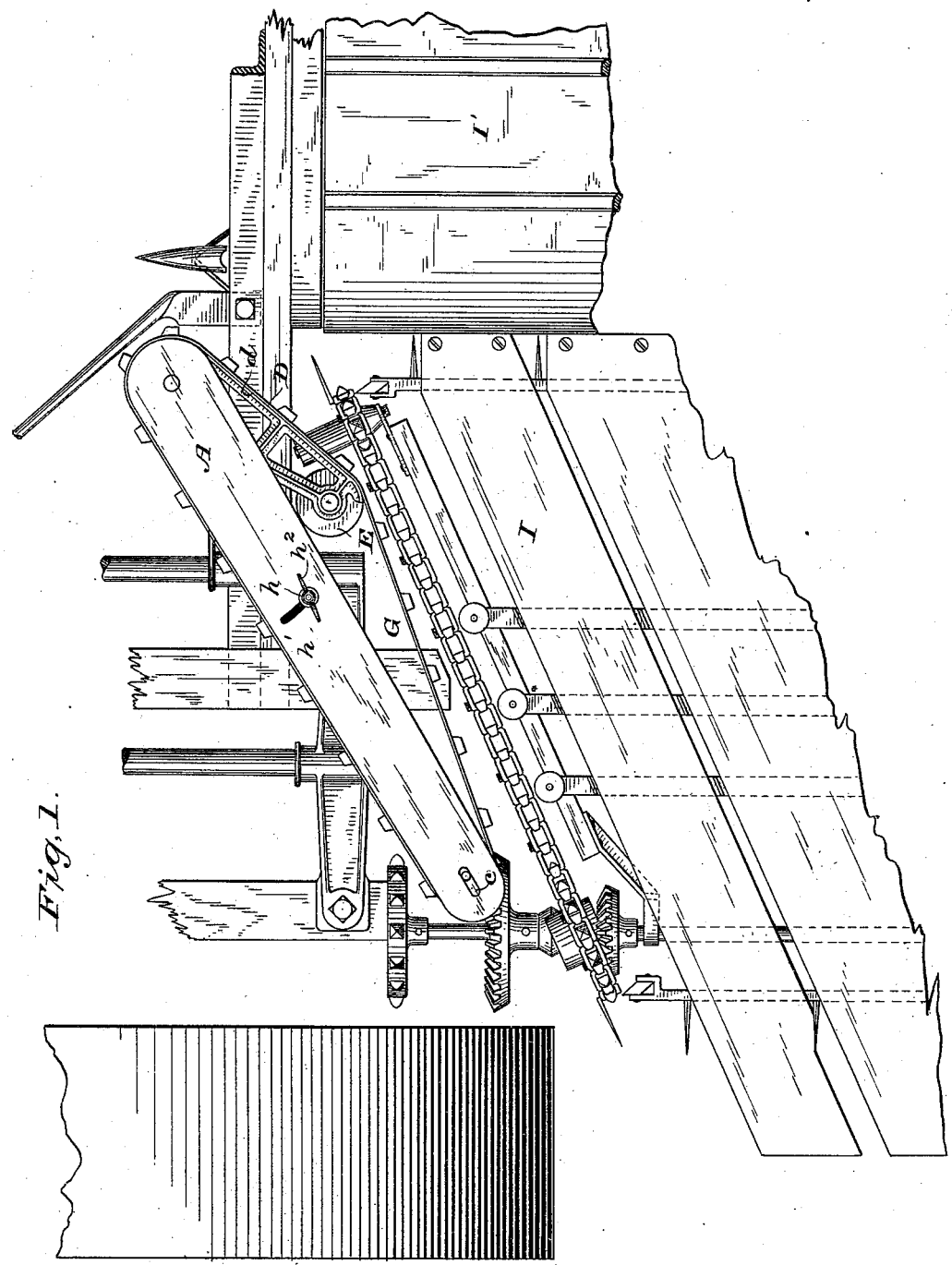

(No Model.) 4 Sheets—Sheet 2.

W. R. BAKER.
BUTT ADJUSTER FOR GRAIN BINDERS.

No. 357,141. Patented Feb. 1, 1887.

WITNESSES
Wm A. Skinkle
Henry A. Lamb

INVENTOR
William R. Baker.
By his Attorneys (No Model.) 4 Sheets—Sheet 3.
W. R. BAKER.
BUTT ADJUSTER FOR GRAIN BINDERS.
No. 357,141. Patented Feb. 1, 1887.

WITNESSES
INVENTOR
William R. Baker.
By his Attorneys (No Model.) 4 Sheets—Sheet 4.
W. R. BAKER.
BUTT ADJUSTER FOR GRAIN BINDERS.
No. 357,141. Patented Feb. 1, 1887.
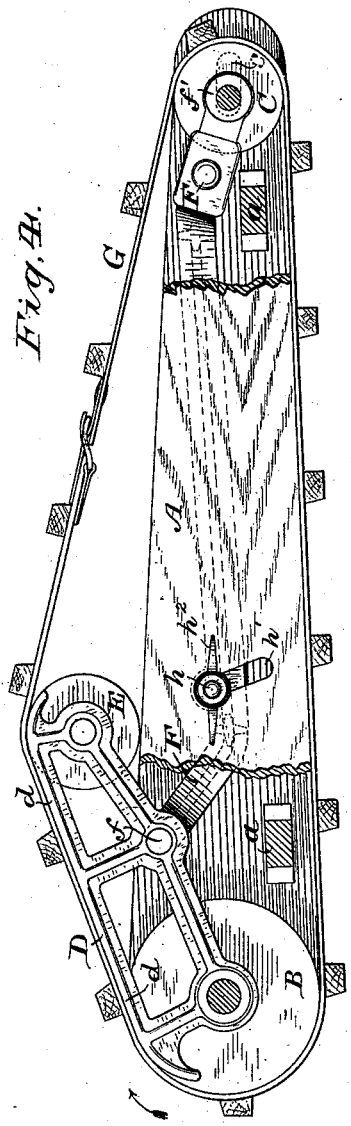
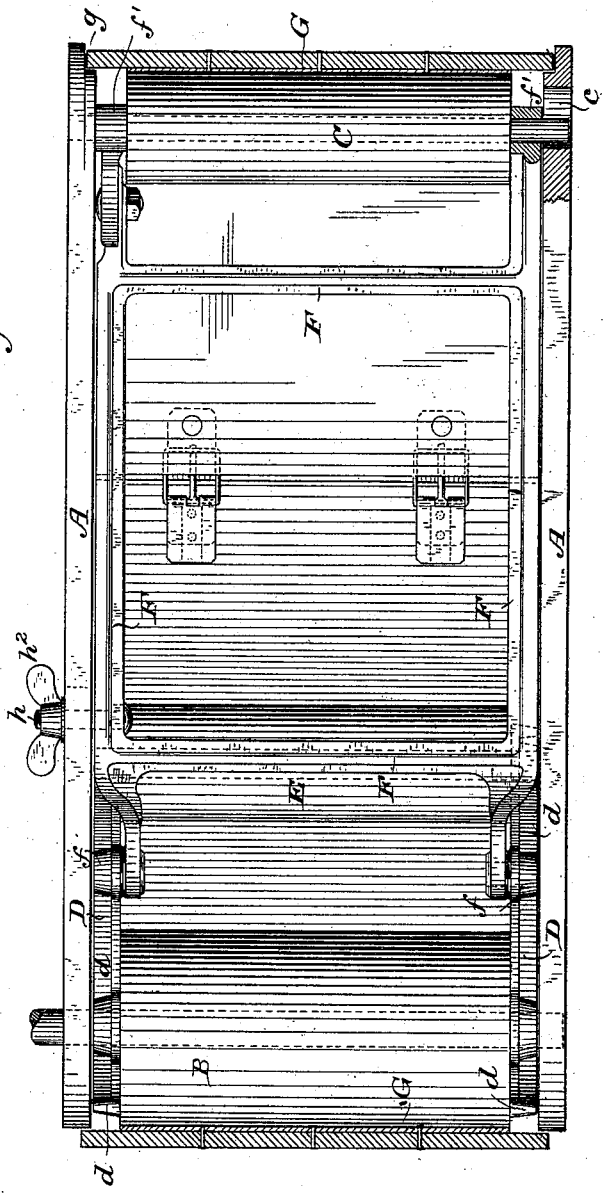
WITNESSES
Wm A. Skinkle
Henry A. Lamb
INVENTOR
William R. Baker
By his Attorneys

UNITED STATES PATENT OFFICE.

WILLIAM R. BAKER, OF CHICAGO, ILLINOIS, ASSIGNOR TO THE McCORMICK HARVESTING MACHINE COMPANY, OF SAME PLACE.

BUTT-ADJUSTER FOR GRAIN-BINDERS.

SPECIFICATION forming part of Letters Patent No. 357,141, dated February 1, 1887.

Application filed May 19, 1885. Serial No. 166,033. (No model.)

*To all whom it may concern:*

Be it known that I, WILLIAM R. BAKER, a citizen of the United States, residing at Chicago, in the county of Cook and State of Illinois, have invented certain new and useful Improvements in Butt-Adjusters for Grain-Binders, of which the following is a specification.

It often happens that a field of grain, or a large portion of a field, is so beaten down or lodged that in cutting with a harvester and binder much of the crop will unavoidably be inclined toward the stubble side of the machine. In such cases it falls upon the platform-carrier or traveling apron with its heads pointing in the direction of movement of said carrier and with its stalks nearly parallel with the finger-bar, and in this position is taken toward the binder. When a Marsh harvester is employed the evil is corrected to a considerable but not always sufficient extent as the grain goes up the elevator, but in low-level binders, particularly those which have no elevator or only a slight ascent at the inner end of the platform to accommodate the binding mechanism and gearing beneath, such grain is almost sure to go into the binding-receptacle in the position in which it fell, and will then be bound as a tangled mass, having no definite form or coherence.

With the usual form of traveling butt-adjuster employed in binders, consisting simply of an apron passing over rollers at each end of an upright frame and swinging on a pivot within and adjacent to the inner shoe or divider, the mischief is only increased so far as relates to the low-level machines, since the grain comes to the adjuster or butter apron almost parallel with its effective side, and the slats on said apron, catching upon it or upon the butts, simply accelerate its movement into the receptacle, as their force is exerted in the direction of the length of the grain, and it is not, as a rule, corrected in binders working with an elevator. In the use of butter-aprons, also, which, as is well known, have one end strapped to the other and overlapping it loosely, it has been found that this overlapping piece in passing the pivotal roller is swung out and strikes or whips against the supporting-bracket repeatedly, and so wears away very fast. The ends of the straps, which usually project beyond this flap, assist in this whipping or thrashing movement against the bracket and are themselves worn, so that after a short time the apron has to be replaced by a new one or have a piece sewed on.

I propose to remedy the first defect by so constructing the butter that the stalks of grain will be deflected by the initial portion of its traveling surface and pushed toward the rear until the butts come into such position that they may be properly caught and acted upon by the remaining portion of the exposed or traveling surface to accelerate their action relatively to the heads and thus bring them up abreast thereof, and the second by attaching a shield or guide to the bracket which supports the pivotal roller or to an adjacent part of the frame-work which extends over and in close proximity to the back of the apron and is curved at its ends, so that the flap, approaching it and passing beneath it while the belt is still straight, may be kept down and prevented from striking or whipping against the bracket; and to these ends my invention consists in a butt-adjuster composed of a traveling belt supported upon a frame swinging upon a pivot behind the inner shoe and upon rollers at each end of said frame, and one of which is adjustable, and an intermediate roller adjustable in and out toward and from the rear of the platform simultaneously with, but conversely to, the adjustment of the other; in the combination, to form a butt-adjuster, of a supporting-frame composed of top and bottom boards connected by cross-pieces, a driving-roller at one end of said frame, an idle roller at the other end, a third roller mounted between the two upon a swinging frame, and a connection between said frame and the idle roller, whereby as the swinging roller is adjusted in and out the idle roller will be moved out and in to maintain the tension of the belt; in a shield or guard to prevent the loose flap of the butter-apron from thrashing against the adjacent frame-work, and in the various other combinations and details of construction hereinafter set forth and claimed.

Figure 2:
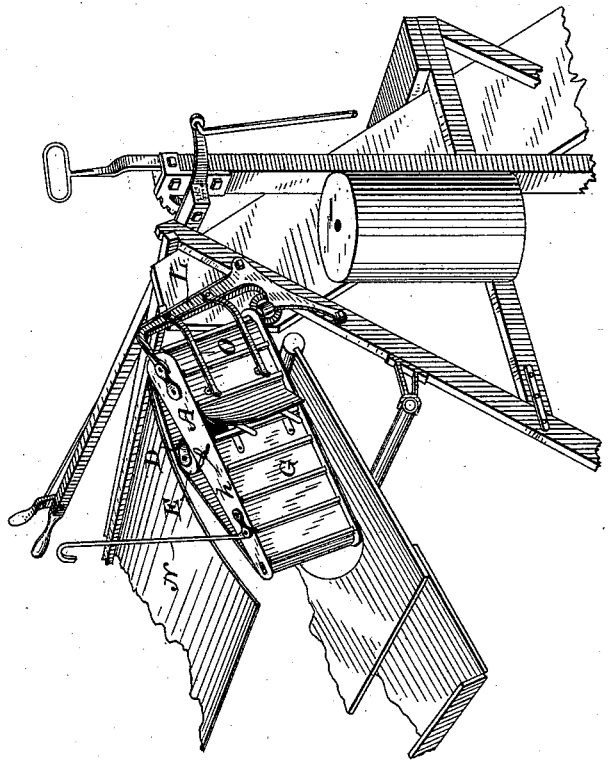
Figure 3:
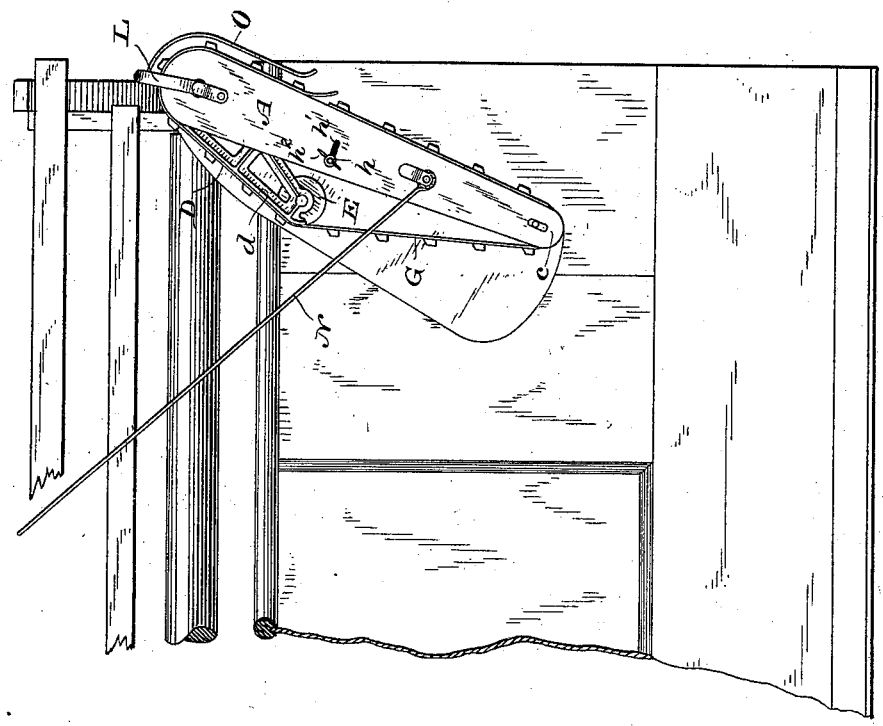

In the drawings, Figure 1 is a top plan view of a low-level binder embodying the first feature of my invention; Fig. 2, a perspective view from the front of said improved butter-apron applied to the grain-chute of an elevator-binder, with the shield or guide in position to restrain the flap; Fig. 3, a top plan view thereof; Fig. 4, an enlarged top plan view, partly broken away to expose the mechanism of the butter frame and apron; and Fig. 5, a front elevation thereof with the belt or apron in section.

The butter-frame is composed, as usual, of top and bottom boards A, connected by cross-bars $a$ and at one end provided with bearings for the shaft or gudgeons of the driving-roller B, upon the axle of which the frame swings pivotally. At the other end the boards are longitudinally slotted, as at $c$, to receive and guide the extended gudgeons of the idle roller C as it is moved in or out in the direction of the length of the frame.

On the shaft of the driving-roller, at each end thereof, between the roller itself and the frame-boards, are journaled skeleton plates D, having flanges $d$ along their exposed edges, which flanges are curved inwardly at each end, for a purpose presently explained, and bearing in their free ends a third roller, E, the periphery of which comes flush with the flanges and the curve at this end. The periphery of the driving-roller is also flush with the flange at the other end, but sits out from the extreme end of the curve that the belt may not catch.

A metal frame, F, is hinged in bearings $f$ in and about midway of the length of the plates which support the swinging roller, and thence bends down slightly to permit this roller to be closed in in its swinging movement without interference. The lateral arms of the frame F extend to the idle roller and have boxes or bearings $f'$, filling the space between the ends of said roller and the top and bottom boards of the butter-frame in which the gudgeons of the roller are received by which said boards are steadied and braced. Preferably this "extension-frame," as I will call it, is made of essentially rectangular shape, its two side bars lying parallel with and close to the top and bottom boards of the butter-frame, so as to strengthen the whole construction. The three rollers being thus connected together through the instrumentality of the swinging frame and extension-frame, and the idle roller being guided, as already stated, in the top and bottom boards of the butter-frame, the apron G is placed over them and drawn tight. This apron will then rest upon the periphery of the rollers upon the flanges of the swinging frame and between the usual guides formed in the boards beyond the idle roller and will be driven in the direction indicated by the arrow in Fig. 4, for which reason the flanges of the swinging frame curve inward beneath the periphery of the driving-roller at that point, as already alluded to, in order that they may not catch in the apron and obstruct or stop it.

Now, it is evident that if the extension-frame is moved inward to lessen the distance between the driving-roller and the idle roller at the opposite end of the frame the swinging roller will be correspondingly moved out toward the rear of the platform or of the grain-chute, thus forming an angle in the base of the belt on that side or dividing it into two sections of traveling surface of different inclination; and, on the other hand, if the swing-roller is shut in the idle roller will be moved out, bringing the butter-apron, if desired, into the usual form with its effective surface straight. Owing to the relative movements of the swinging roller and the idle roller in such adjustments the apron or belt will always be kept strained or tightened.

From the upper bar of the extension-frame a screw-threaded pin, $h$, projects through the top board of the butter-frame, which is slotted, as at $h'$, in a direction corresponding to the resultant movement of this pin induced by the play of the two adjusting-frames. On the end of this pin is placed a washer and a thumb-nut, $h^2$, whereby the extension-frame may be clamped to the top board and held rigidly at any given adjustment of the rollers which it controls.

It will be understood from this description that whenever grain is being delivered with its stalks trending in the direction of the length of the finger-bar or of the machine—that is, awry—the swinging roller of the butt-adjuster will be arranged in such position as to cause a sharp deflection in the face of the belt between itself and the driving-roller, directed toward the rear of the machine at an angle determined partly by the adjustment of said swinging roller itself and partly by the adjustment of the butter-frame as a whole. The grain brought up by the carrier will reach this deflecting-surface parallel or nearly parallel with its face, and, being caught either on its side or on the butts by the slats of the butter-belt, will be deflected and pushed lengthwise toward the rear until the butts have reached the bend in the belt where the swinging roller is located. They will then be carried sharply round and taken on by the slats between the swinging roller and the idle roller, which will tend to bring them abreast of the heads now lying in their proper position near the rear of the machine.

In applying this butter-apron to a low-level or low-down binder the driving-roller will be supported in bearings just inside of the inner shoe or divider and slightly in advance of the cutter-bar, as shown in Fig. 1, and the frame will extend thence along the grain-receptacle or, in the present instance, along the low elevator I a suitable distance, and will be controlled at the free end in the usual manner, so that it may be swung toward or from said receptacle or elevator. It will then receive at the pivotal end whatever grain is delivered by the platform-carrier I', even should such grain project over the finger-bar, and as this grain-strikes the lower deflecting-surface it will be pushed lengthwise across the receptacle or elevator by the apron-slats until the butts reach that part of the apron lying more nearly parallel with the trend of the receptacle or elevator, when, as before explained, they will be caught and carried on abreast of the heads. In applying it to an elevator-binder or a high-delivery binder it will be hinged at the head of the grain-chute by means of the usual bracket, L, and the deflecting-surface will be formed immediately adjacent to the head of said chute, or to the delivery-point of the elevator-aprons, so that the grain brought up may first strike this surface. It will be adjusted or swung in or out as required by the rod N, such as customary in these structures, which will also be employed, or an equivalent thereof, in connection with the low-down machine.

Now, as before stated, one of the difficulties encountered in the use of these butter-aprons is that the loose flap of canvas where the ends are united and the ends of the straps uniting these flaps fly out and whip against the supporting-bracket whenever they are whirled round the pivotal driving-roller, and so they are speedily worn out. To prevent this I attach to the bracket or to the adjacent framework a shield or guide, O, which may be a single piece of sheet metal, but is in the present instance shown as composed of two fingers extending out parallel with the back or unexposed portion of the belt or apron and in close proximity to its surface, and curved at their ends, so that the flap approaching them while still in the straight fly of the belt shall be pressed down, keeping with it the straps until it is practically past the supporting-bracket and there is no longer any danger of its being whirled out and striking it.

I claim as my invention—

1. The combination, substantially as hereinbefore set forth, with the delivery apparatus of a harvester-binder, of a roller at the receiving end thereof, an idle roller at the discharge end of the frame and adjustable longitudinally thereof, an intermediate roller in an adjustable frame swinging upon the gudgeons of the pivotal driving-roller, whereby it may be set out from the line of the others on the grain side of the frame and retained in such position, and a slatted apron stretched across the three rollers.

2. The combination, substantially as hereinbefore set forth, in a butt-adjuster for grain-binders, of the driving-roller, the idle end roller adjustable in and out longitudinally of the supporting-frame, the intermediate roller adjustable out and in transversely of said frame and on the grain side thereof, means whereby the idle roller and intermediate roller may be concurrently and simultaneously adjusted, and the apron stretched over the three rollers.

3. The combination, substantially as hereinbefore set forth, in a butt-adjuster for grain-binders, of the driving-roller, the idle end roller capable of being moved toward and from the driving-roller, the intermediate roller adjustable out and in with reference to the plane of the other two and on the grain side thereof, means whereby the adjustment of the intermediate roller inversely adjusts the idle roller, and a belt or apron stretched over the three rollers.

4. The combination, substantially as hereinbefore set forth, to form a butt-adjuster for grain-binders, of the butter-frame, the pivotal driving-roller at one end thereof, the idle roller mounted in sliding bearings, the intermediate roller mounted in an adjustable frame, whereby it may be set out from the line of the others on the grain side of the frame, a connection between the bearings of the idle roller and the frame which supports the intermediate roller, whereby the former is concurrently adjusted, and the apron stretched over the three rollers.

5. The combination, substantially as hereinbefore set forth, in a butt-adjuster for grain-binders, of the driving-roller, the idle end roller, the swinging arms or plates journaled on the gudgeons of the driving-roller, the deflecting-roller carried in the free ends of said arms between the driving-roller and the idle roller, the extension-frame hinged at one end to said arms and at the other having bearings for the idle-roller, and the belt or apron thrown over the three rollers.

6. The combination, substantially as hereinbefore set forth, in a butt-adjuster for grain-binders, of the wooden frame composed of top and bottom boards and cross-pieces, the driving-roller journaled at one end of said frame, the swinging arms pivoted inside the boards at each end of the driving-roller, the deflecting-roller journaled in the free ends of said arms, the extension-frame hinged to said arms, and the idle end roller mounted in bearings at the outer end of the extension-frame with its gudgeons entering and guided by the longitudinal slots in the top and bottom boards.

7. The combination, substantially as hereinbefore set forth, in a butt-adjuster for grain-binders, of the wooden frame composed of top and bottom boards and cross-bars, the driving-roller journaled at one end of said frame, the swinging arms pivoted inside the boards at each end of the driving-roller, the deflecting-roller journaled in the free ends of said arms, the extension-frame hinged to said arms, the idle roller mounted in bearings at the outer end of the extension-frame, the pin projecting from the extension-frame through a slot in the top board, and the clamping-nut on said pin.

8. The combination, substantially as hereinbefore set forth, in a butt-adjuster, of a driving-roller at one end of the frame, an idle roller at the other end, the swinging arms pivoted to the driving-roller, a deflecting-roller carried in the outer ends of said arms, an extension-frame connecting the arms and the idle roller, and flanges on said arms curved relatively to the driving-roller and deflecting-roller, as set forth.

9. The combination, substantially as hereinbefore set forth, with the apron of a butt-adjuster, of a shield or guide arranged near the supporting-point of said adjuster and reaching alongside of and in close proximity to the apron as it approaches the pivotal roller to prevent the flap from being swung out and striking the supporting-bracket or adjacent parts.

10. The combination, with the butt-adjuster, of the shield or guide composed of two or more fingers attached to the supporting-bracket or adjacent frame-work and extending alongside of the apron in close proximity thereto and curved outward at their ends to prevent the overlapping flap of said apron from being thrown out against the bracket or adjacent parts in passing the pivotal roller.

WILLIAM R. BAKER.

Witnesses:
PAUL ARNOLD,
HENRY E. PRIDMORE.